United States Patent Office 2,864,843
Patented Dec. 16, 1958

2,864,843

CYCLOPENTADIENYL MOIETY-CONTAINING METAL MONOHALIDES

Earl G. De Witt, Royal Oak, and Hymin Shapiro and Jerome E. Brown, Detroit, Mich., assignors to Ethyl Corporation, New York, N. Y., a corporation of Delaware No Drawing. Application May 6, 1953
Serial No. 353,434

11 Claims. (Cl. 260—429.9)

The present invention relates to a novel class of metal-containing organic compounds of the "mixed" variety. That is to say, the present invention is concerned with organometallic compounds containing at least three different constituents.

This application is a continuation-in-part of co-pending application, Serial No. 307,374, filed August 30, 1952, now abandoned, and application, Serial No. 325,224, filed December 10, 1952, now Patent No. 2,818,416.

Heretofore the greatest utility of "mixed" organic compounds has been their use as intermediates in chemical synthesis. Such compounds are of considerable potential importance in the preparation of articles of commerce of economic and technological importance. For example, "mixed" organic compounds potentialy are of considerable utility in the preparation of pharmaceuticals such as diuretics and therapeutic agents; agricultural chemicals such as insecticides, biocides, fungicides, miticides, seed disinfectants, and the like; and other useful products as, for example, fuel and lubricant additives, dyes, mordants, pigments, curing agents for leather and the like. However, but for a few limited exceptions these goals have not been realized primarily because of the paucity of suitable mixed organic compounds possessing the requisite chemical, physical and toxicological properties. For example, many of the mixed organometallic compounds known heretofore have suffered such disadvantages as being extremely toxic materials or compounds possessing other undesirable physiological characteristics. Likewise prior compounds of this nature are characterized by such properties as extreme reactivity, often leading to extremely violent chemical reactions, instability, high cost, and the attendant necessity of utilizing close chemical control in their utilization. Therefore, the need exists for mixed organometallic compounds which are stable to common environments but which react readily with diverse chemical reagents so as to facilitate the preparation of pharmaceuticals, agricultural chemicals and other useful products.

It is, therefore, an object of this invention to provide as new compositions of matter a novel class of mixed organometallic compounds. Likewise, it is an object of this invention to provide processes for the preparation of these new compositions of matter. An additional object of the present invention is to provide a class of mixed metallic cyclopentadienyl moiety-containing compounds of particular utility as chemical intermediates in the preparation of useful materials. Similarly, the provision of mixed organometallic cyclopentadienyl moiety-containing compounds useful in their own right in diverse formulations is another object of this invention. Other important objects will become apparent from the discussion hereinafter.

We have now found that the above and other objects of the present invention can be accomplished by providing as new compositions of matter mixed cyclopentadienyl moiety-containing organic compounds possessing the general formula $$R_nMX$$

wherein R is a cyclopentadienyl moiety-containing radical, that is, a cyclomatic radical, n is a small whole integer from 1 to 2 inclusive, M is a metallic or metalloid element and X is a halogen atom.

In accordance with the preceding general formula R is a cyclopentadienyl moiety-containing radical which can alternatively be considered as a cyclomatic radical. Before further considering the nature of these cyclopentadienyl moiety-containing radicals the term "organic radical" is to be considered inasmuch as the cyclopentadienyl moiety-containing radicals are frequently substituted with organic radicals. Therefore, as used in the description of the present invention the term "organic radicals" denotes univalent aliphatic, alicyclic or aromatic radicals. By the term univalent aliphatic radical is intended a univalent radical derived from an open chain saturated or unsaturated carbon compound, that is to say, an acyclic radical. The term univalent alicyclic radical denotes a monovalent radical derived from the corresponding aliphatic compounds by ring formation. The term univalent aromatic radical denotes a monovalent radical derived from a compound of the benzene series containing at least one ring with the peculiar type of unsaturation inherent in such aromatic compounds.

When a cyclomatic radical of the compounds of our invention is substituted with univalent aliphatic radicals, these substituents can be a radical selected from the group consisting of alkyl, alkenyl, aralkyl and aralkenyl. Thus, when these substituents are univalent aliphatic radicals they can be alkyl radicals such as, for example, methyl, ethyl, n-propyl, isopropyl, n-butyl, isobutyl, sec-butyl, t-butyl, n-amyl, and the various positional isomers thereof, as for example, 1-methyl-butyl, 2-methyl-butyl, 3-methyl-butyl, 1,1-dimethyl-propyl, 1,2-dimethyl-propyl, 2,2-dimethyl-propyl, and 1-ethyl-propyl, and likewise the corresponding straight and branched chain isomers of hexyl, heptyl, octyl, nonyl, decyl, undecyl, dodecyl, tridecyl, tetradecyl, pentadecyl, hexadecyl, heptadecyl, octadecyl, nondecyl, eicosyl and the like. Likewise, the univalent aliphatic substituent of the cyclomatic radicals of the compounds of the present invention can be an alkenyl radical such as, for example, ethenyl-1-propenyl, 2-propenyl, isopropenyl, $\Delta^1$-butenyl, $\Delta^2$-butenyl, $\Delta^3$-butenyl, and the corresponding branched chain isomers thereof, as for example, $\Delta^1$-isobutenyl, $\Delta^2$-isobutenyl, $\Delta^1$-sec-butenyl, $\Delta^2$-sec-butenyl, including 1-methylene-$\Delta^2$-propenyl, $\Delta^1$-pentenyl, $\Delta^2$-pentenyl, $\Delta^3$-pentenyl, $\Delta^4$-pentenyl, and the corresponding branched chain isomers thereof; $\Delta^1$-hexenyl, $\Delta^2$-hexenyl, $\Delta^3$-hexenyl, $\Delta^4$-hexenyl, $\Delta^5$-hexenyl, and the corresponding branched chain isomers thereof, including, 3,3-dimethyl-$\Delta^1$-butenyl; 2,3-dimethyl-$\Delta^1$-butenyl; 2,3-dimethyl-$\Delta^2$-butenyl; 2,3-dimethyl-$\Delta^3$-butenyl; and 1-methyl-1-ethyl-$\Delta^2$-propenyl; and similarly, the various isomers of heptenyl, octenyl, nonenyl, decenyl, undecenyl, dodecenyl, tridecenyl, tetradecenyl, pentadecenyl, hexadecenyl, heptadecenyl, octadecenyl, nondecenyl, eicosenyl, and the like.

In addition, when the organic radical substituted in the cyclomatic group is a univalent aliphatic radical, it can be an aralkyl radical such as, for example, benzyl, α-phenyl-ethyl, β-phenyl-ethyl, α-phenyl-propyl, β-phenyl-propyl, γ-phenyl-propyl, α-phenyl-isopropyl, β-phenyl-isopropyl, α-phenyl-butyl, β-phenyl-butyl, γ-phenyl-butyl, δ-phenyl-butyl, α-phenyl-isobutyl, β-phenyl-isobutyl, γ-phenyl - isobutyl, α - phenyl - sec - butyl, β - phenyl - sec-butyl, γ - phenyl - sec - butyl, β - phenyl - t - butyl, α'-naphthyl-methyl, β'-naphthyl-methyl, α-(α'-naphthyl)-ethyl, α - (β' - naphthyl) - ethyl, β - (α'-naphthyl)-ethyl, β - (β' - naphthyl) - ethyl, α-(α'-naphthyl)-propyl, α-(β'- naphthyl)-propyl, β-(α'-naphthyl)-propyl, β-(β'-naphthyl)-propyl, γ-(α'-naphthyl)-propyl, γ-(β'-naphthyl)-propyl, α-(α'-naphthyl)-isopropyl, α-(β'-naphthyl)-isopropyl, α-(α'-naphthyl)-butyl, α-(β'-naphthyl)-butyl, β-(α'-naphthyl)-butyl, β-(β'-naphthyl)-butyl, γ-(α'-naphthyl)-butyl, γ-(β'-naphthyl)-butyl, δ-(α'-naphthyl)-butyl, α-(α'-naphthyl)-isobutyl, α-(β'-naphthyl)-isobutyl, β-(α'-naphthyl)-isobutyl, γ-(β'-naphthyl)-isobutyl, α-(α'-naphthyl)-sec-butyl, α-(β'-naphthyl)-sec-butyl, β-(α'-naphthyl)-sec-butyl, β-(β'-naphthyl)-sec-butyl, γ-(α'-naphthyl)-sec-butyl, γ-(β'-naphthyl)-sec-butyl, β-(α'-naphthyl)-t-butyl, β-(β'-naphthyl)-t-butyl, the corresponding α'- and β'-naphthyl derivatives of n-amyl and the various positional isomers thereof such as, for example, said derivatives of 1-methyl-butyl, 2-methyl-butyl, 3-methyl-butyl, 1,1-dimethyl-propyl, 1,2-dimethyl-propyl, 2,2-dimethyl-propyl, 1-ethyl-propyl, and likewise said derivatives of the corresponding isomers of hexyl, heptyl, octyl, and the like, including eicosyl. Other such aralkyl radicals of the compounds of our invention include the α'-, β'-, and γ'-anthryl derivatives of alkyl radicals, such as, for example, α'-anthryl-methyl, α-(β'-anthryl)-ethyl, β-(γ'-anthryl)-ethyl, α-(α'-anthryl)-butyl, δ-(β'-anthryl)-2-methyl-amyl, and the like, and the corresponding alkyl derivatives of phenanthrene, fluorene, acenaphthene, chrysene, pyrene, triphenylene, naphthacene, and the like. Similarly, the univalent aliphatic radical substituted in the cyclomatic group of the compounds of our invention can be an aralkenyl radical such as, for example, α-phenyl-ethenyl, β-phenyl-ethenyl, α-phenyl-Δ¹-propenyl, β-phenyl-Δ¹-propenyl, γ-phenyl-Δ¹-propenyl, α-phenyl-Δ²-propenyl, β-phenyl-Δ²-propenyl, γ-phenyl-Δ²-propenyl, β-phenyl-isopropenyl, and similarly, the phenyl derivatives of the isomers of butenyl, pentyl, hexenyl, heptenyl, and the like, up to and including about eicosenyl. Other such arylalkenyls include α-(α'-naphthyl)-ethenyl, α-(β'-naphthyl)-ethenyl, β-(α'-naphthyl)-ethenyl, β-(β'-naphthyl)-ethenyl, α-(α'-naphthyl)-Δ¹-propenyl, α-(β'-naphthyl)-Δ¹-propenyl, β-(α'-naphthyl)-Δ¹-propenyl, β-(β'-naphthyl)-Δ¹-propenyl, α-(α'-naphthyl)-Δ²-propenyl, α-(β'-naphthyl)-Δ²-propenyl, β-(α'-naphthyl)-Δ²-propenyl, β-(β'-naphthyl)-Δ²-propenyl, α-(α'-naphthyl)-isopropenyl, α-(β'-naphthyl)-isopropenyl, β-(α'-naphthyl)-isopropenyl, β-(β'-naphthyl)-isopropenyl, and the like. In addition, such aromatic derivatives of alkenyls, that is, aralkenyl radicals include derivatives of phenanthrene, fluorene, acenaphthene, chrysene, pyrene, triphenylene, naphthacene, and the like.

When the organic radicals comprising the substituents in the cyclomatic groups of the compounds of our invention are univalent alicyclic radicals, these can be radicals selected from the group consisting of cycloalkyl and cycloalkenyl radicals. Thus, such univalent alicyclic radicals can be cycloalkyl radicals such as, for example, cyclopropyl, cyclobutyl, cycloamyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, cyclooctadecyl, cyclononadecyl, cycloeicosyl, and such cyclo-aliphatic radicals as α-cyclopropyl-ethyl, β-cyclopropyl-ethyl, α-cyclobutyl-propyl, β-cyclobutyl-propyl, γ-cyclobutyl-propyl, α-cycloamyl-isopropyl, β-cycloamyl-isopropyl, and the like. Similarly, the alicyclic radical substituents of the cyclomatic groups of the novel cyclomatic compounds of the present invention can be cycloalkenyl radicals such as, for example, α-cyclohexyl-ethenyl, β-cyclohexyl-ethenyl, α-cycloheptyl-Δ¹-propenyl, β-cycloheptyl-Δ¹-propenyl, γ-cycloheptyl-Δ¹-propenyl, α-cyclooctyl-Δ²-propenyl, β-cyclooctyl-Δ²-propenyl, γ-cyclooctyl-Δ²-propenyl, β-cyclononyl-isopropenyl, α-methylene-β-cyclododecyl-ethyl, and the like.

When the organic radicals substituted in the cyclomatic groups of our compounds are univalent aromatic radicals they can be selected from the group consisting of aryl and alkaryl radicals. Thus, these univalent aromatic radicals can be aryl radicals such as, for example, phenyl-α-naphthyl, β-naphthyl, α-anthryl, β-anthryl, γ-anthryl, and the like, including the various monovalent radicals of such aromatics as indene, isoindene, acenaphthene, fluorene, phenanthrene, naphthacene, chrysene, pyrene, triphenylene, and the like. Moreover, these univalent aromatic radicals can be alkaryl radicals such as, for example, o-tolyl, m-totyl, p-tolyl, 2,3-xylyl, 2,4-xylyl, 2,5-xylyl, 2,6-xylyl, 3,4-xylyl, 3,5-xylyl, o-cumenyl, m-cumenyl, p-cumenyl, mesityl, o-ethylphenyl, m-ethylphenyl, p-ethylphenyl, 2-methyl-α-naphthyl, 3-methyl-α-naphthyl, 4-methyl-α-naphthyl, 5-methyl-α-naphthyl, 6-methyl-α-naphthyl, 7-methyl-α-naphthyl, 8-methyl-α-naphthyl, 1-ethyl-β-naphthyl, 3-ethyl-β-naphthyl, 4-ethyl-β-naphthyl, 5-ethyl-β-naphthyl, 6-ethyl-β-naphthyl, 7-ethyl-β-naphthyl, 8-ethyl-β-naphthyl, 2,3-dipropyl-α-naphthyl, 5,8-diisopropyl-β-naphthyl, and the like.

Having amply described the meaning of the term "organic radical," the discussion with regard to cyclomatic radicals has been facilitated. As stated hereinabove, the cyclomatic groups of the compounds of the present invention can be represented by four general formulae. The first class of cyclomatic radicals can be represented by the general formula

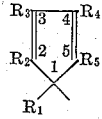

wherein each of $R_1$, $R_2$, $R_3$, $R_4$, and $R_5$ can be the same or different and is selected from the group consisting of hydrogen and organic radicals. Illustrative examples of such cyclomatic radicals include cyclopentadienyl, 1-methyl-cyclopentadienyl, 2,3-dimethyl-cyclopentadienyl, 3-ethyl-cyclopentadienyl, 1,3,4-tripropyl-cyclopentadienyl, 1,5-dipentyl-cyclopentadienyl, 2-methyl-4-tertiarybutyl-cyclopentadienyl, 3-isopropenyl-cyclopentadienyl, 3,4-di-(Δ²-isobutenyl)-cyclopentadienyl, 3-methyl-5-(Δ¹-pentenyl)-cyclopentadienyl, 3-(β-phenylethyl)-cyclopentadienyl, 3-hexyl-4-(β-phenylpropyl)-cyclopentadienyl, 2-methyl-3-(Δ¹-propenyl)-4-(γ-phenylbutyl)-cyclopentadienyl, 3-(β-phenylethenyl)-cyclopentadienyl, 3-cyclohexyl-cyclopentadienyl, 3,4-dicyclopropyl-cyclopentadienyl, 5-(α-cyclohexylethenyl)-cyclopentadienyl, 2-phenyl-cyclopentadienyl, 1-ethyl-3-(α-methyl)-cyclopentadienyl, 2-(o-tolyl)-cyclopentadienyl, and the like.

The second type of cyclomatic radical is the indenyl type radical represented by the general formula

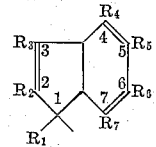

wherein each of $R_1$, $R_2$, $R_3$, $R_4$, $R_5$, $R_6$, and $R_7$ can be the same or different and is selected from the group consisting of hydrogen and organic radicals. Illustrative examples of such cyclomatic radicals include indenyl, 2-methyl-indenyl, 3-sec-butyl-indenyl, 3,4-diethenyl-indenyl, 5-(α-phenylbutyl)-indenyl, 3-methyl-4-(β-phenylethyl)-indenyl, 6-(phenylbutyl)-indenyl, 3-cyclohexyl-indenyl, 2,5-di-(α-cyclopropylethyl)-indenyl, 3-phenyl-indenyl, 4,5-diphenyl-indenyl, 5-(mesityl)-indenyl, 3-(2,4-xylyl)-indenyl, and the like.

The third type of cyclomatic radical of the new compositions of matter of the present invention is a radical of the fluorenyl type which can be represented by the general formula

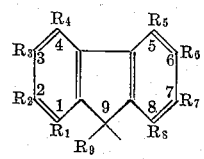

wherein each of $R_1$, $R_2$, $R_3$, $R_4$, $R_5$, $R_6$, $R_7$, $R_8$, and $R_9$ can be the same or different and is selected from the group consisting of hydrogen and organic radicals. Illustrative examples of such radicals include fluorenyl, 3-ethyl-fluorenyl, 4,5-dipropyl-fluorenyl, 9-methyl-fluorenyl, 6-ethenyl-fluorenyl, 4-benzyl-fluorenyl, 2-($\beta$-phenylethenyl)-fluorenyl, 4,5-di-(cyclooctyl)-fluorenyl, 3-($\beta$-cyclohexylethenyl)-fluorenyl, 3,6-di-(phenyl)-fluorenyl, 2-m-tolyl-fluorenyl, and the like.

The fourth type of cyclomatic radical, that is, a radical containing the cyclopentadienyl moiety can be represented by the general formula

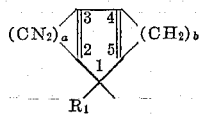

wherein $a$ and $b$ can be the same or different and are small whole integers including 0 and excluding 1, and wherein $R_1$ is selected from the class consisting of hydrogen and organic radicals. Thus, when $a$ is zero each of the carbon atoms designated as 2 and 3 have attached thereto a monovalent radical selected from the class consisting of hydrogen and organic radicals. Furthermore, the monovalent radicals so attached can be the same or different. The same discussion applies to each of the carbon atoms designated as 4 and 5 when $b$ is zero. Illustrative examples of this type of cyclomatic radical include 4,5,6,7-tetrahydroindenyl; 1,2,3,4,5,6,7,8-octahydrofluorenyl; 3-methyl-4,5,6,7-tetrahydroindenyl; 2-ethyl-3-phenyl-4,5,6,7-tetrahydroindenyl, and the like.

Inspection of the general formula of the mixed cyclopentadienyl moiety-containing organometallic compounds of the present invention reveals the fact that the second constituent present in such materials is a metallic or metalloid element. In general, the metallic or metalloid constituent of the compositions of matter of the present invention is a heavy metal or is selected from the group of non-metals consisting of boron, phosphorus and arsenic. By the term heavy metals is intended a metallic element found in groups 1B, 2B, 3A, 3B, 4A, 4B, 5A, 5B, 6A, 6B, and 7B, that is to say, the term heavy metals encompasses the elements of the periodic table between groups 3B and 6A in the periodic chart of the elements found in "Fundamental Chemistry," second edition, by H. G. Deming, with the exception of the elements of group 8. Thus, the metallic or metalloid constituent of the cyclopentadienyl moiety-containing mixed organic compounds of the present invention can be considered as an element normally capable of forming divalent and trivalent positively charged ions.

In accordance with the preceding discussion relative to the element contained in the compounds of the present invention we prefer to utilize the following:

| Group 1B | Group 2B | Group 3A | Group 3B | Group 4A |
|---|---|---|---|---|
| Copper Silver Gold | Zinc Cadmium Mercury | Boron Aluminum Gallium Indium | Scandium Yttrium Lanthanum | Germanium Tin Lead |

| Group 4B | Group 5A | Group 5B | Group 6B | Group 7B |
|---|---|---|---|---|
| Titanium Zirconium | Phosphorus Arsenic Antimony Bismuth | Vanadium Colombium | Chromium Molybdenum | Manganese Technetium Rhenium |

The third primary constituent of the compositions of matter of the present invention is a halogen as can be seen by reference to the preceding general formula. Thus, the symbol X in that formula represents an element selected from the group consisting of fluorine, chlorine, bromine, and iodine.

The general methods for the preparation of the mixed cyclopentadienyl moiety-containing organometallic compounds of the present invention involve the reaction between a cyclopentadienyl moiety-containing organometallic compound such as a cyclopentadienyl moiety-containing Grignard reagent or cyclopentadienyl moiety-containing alkali metal compound and a metallic salt of the desired element, that is, a metallic halide salt. In conducting this reaction it is generally efficacious to utilize a suitable solvent as, for example, anhydrous ether and to conduct the reaction under the conditions generally utilized in conjunction with Grignard or organo alkali metal compounds.

Subsequent to the reaction the product is then worked up in accordance with the general preparative procedures as, for example, by the use of such methods as solvent extraction, sublimation, filtration, or the like, dependent upon the nature of the particular compound in question. The methods of preparing the cyclomatic metallic halides of the present invention will become still further apparent from the following specific examples.

*Example I*

*Cyclopentadienyl-zinc-chloride.*—To a solution of 136 parts (1 mole) of anhydrous zinc chloride dissolved in 300 parts of anhydrous ether add a solution of approximately one mole of cyclopentadienyl magnesium bromide in anhydrous ether. The reaction is preferably conducted rather slowly, that is, the Grignard reagent is preferably added dropwise to the chloride solution. The ensuing reaction is rapid resulting in the formation of a thick reaction mixture. In accordance with this procedure cyclopentadienyl zinc chloride was prepared, which exists as a white, grainy precipitate. The compound so prepared on analysis corresponds to the general formula $C_5H_5ZnCl$.

The use of this compound in the preparation of cyclopentadienyl zinc alkyl and aryl compounds is described in our co-pending application Serial No. 307,374, filed August 30, 1952, now abandoned.

*Example II*

*Di-(cyclopentadienyl) chromium bromide.*—To 17 parts of anhydrous chromic tribromide dissolved in 200 parts of anhydrous ether add approximately 0.43 mole of cyclopentadienyl lithium. Upon stirring the reaction mixture so formed two phases are formed, a dark violet ether solution and a gray-blue insoluble reaction product. After separating the liquid phase from the solid material and washing the same with benzene a dark blue solid material can be obtained by filtration. This compound does not melt or soften when heated to a temperature of about 285° C. and when ignited leaves a green ash. When the dark blue product is subjected to chemical analysis it corresponds to the general formula $C_{10}H_{10}CrBr$.

*Example III*

*Cyclopentadienyl-cadmium-iodide.*—Prepare a solution of 366 parts (1 mole) of anhydrous cadmium iodide in 300 parts of anhydrous ether. To this solution incrementally add approximately one mole of cyclopentadienyl magnesium iodide dissolved in anhydrous ether. During the above period of addition it is preferable to stir the reaction mixture so as to insure adequate mixing of the reactants. Upon the completion of the above reaction the mixture is considerably thickened due to the formation of the desired product. On subjecting a sample of this compound to chemical analysis, it corresponds to the general formula $C_5H_5CdI$.

The preceding examples are merely illustrative of the materials of the present invention and their means of preparation. It will be apparent to one skilled in the art that analogous reactions to those described hereinabove occur with other cyclopentadienyl moiety-containing alkali metal compounds. That is to say, by reacting a metallic halide with alkyl or aryl substituted cyclopentadienyl reagents the corresponding cyclopentadienyl moiety-containing metallic halides can be prepared. By way of example, when 2-ethyl cyclopentadienyl magnesium bromide is reacted under suitable reaction conditions with zinc bromide, chromium bromide or manganese bromide, the compounds formed are respectively 2-ethyl cyclopentadienyl zinc bromide, di-(2-ethyl cyclopentadienyl) chromium bromide, and 2-ethyl cyclopentadienyl manganese bromide. Similarly, when such Grignard reagents as indenyl magnesium chloride, 3-methyl indenyl magnesium chloride and fluorenyl magnesium chloride are reacted with such halides as cadmium chloride, mercury chloride, titanium chloride, molybdenum chloride, aluminum chloride, chromium chloride, the corresponding mono- and di-cyclopentadienyl moiety-containing metallic mono chlorides are prepared.

The new compositions of matter of the present invention can be further illustrated by the following compounds which can be prepared by the methods described hereinbefore. Illustrative materials include 1-methyl cyclopentadienyl titanium fluoride, 2,3-dimethyl-cyclopentadienyl vanadium fluoride, 3-ethyl-cyclopentadienyl chromium fluoride, 1,3,4-tripropyl-cyclopentadienyl manganese fluoride, 1,5-dipentyl-cyclopentadienyl copper fluoride, 2-methyl-4-tertiary butyl cyclopentadienyl zinc fluoride, 3-isopropenyl cyclopentadienyl germanium fluoride, 3-ethyl cyclopentadienyl vanadium fluoride, 1,5-dipentyl-cyclopentadienyl tin fluoride, 1,3,4-tripropyl cyclopentadienyl rhenium fluoride, 2,3-dimethyl cyclopentadienyl mercury fluoride, 1-methyl cyclopentadienyl lead fluoride, 2-methyl indenyl chromium fluoride, 3-sec-butyl indenyl manganese fluoride, 3,4-diethenyl indenyl cadmium fluoride, 2-methyl indenyl rhenium fluoride, 3-ethyl fluorenyl manganese fluoride, 4,5-dipropyl tin fluoride, 9-methyl fluorenyl germanium fluoride, 4,5,6,7-tetrahydroindenyl titanium fluoride, 3-methyl-4,5,6,7-tetrahydroindenyl chromium fluoride, 1-methyl cyclopentadienyl copper chloride, 1,3,4-tripropyl cyclopentadienyl zinc chloride, 2-methyl-4-tertiary butyl cyclopentadienyl cadmium chloride, 3-isopropenyl cyclopentadienyl tin chloride, 3-ethyl cyclopentadienyl rhenium chloride, 3-sec-butyl indenyl mercury chloride, 2-methyl indenyl lead chloride, 3,4-diethenyl indenyl germanium chloride, 6-(phenylethenyl)-indenyl cadmium chloride, 3-ethyl fluorenyl tin chloride, 4,4-dipropyl fluorenyl copper chloride, 6-ethenyl fluorenyl manganese chloride, 2-ethyl-3-phenyl-4,5,6,7-tetrahydroindenyl chromium chloride, 1,2,3,4,5,6,7,8-octahydrofluorenyl copper chloride, 1-methyl cyclopentadienyl germanium bromide, 1,3,4-tripropyl cyclopentadienyl copper bromide, 1,5-dipentyl-cyclopentadienyl mercury bromide, 2-methyl-4-tertiary butyl cyclopentadienyl rhenium bromide, 3-isopropenyl cyclopentadienyl cadmium bromide, 2-methyl indenyl germanium bromide, 3-sec-butyl indenyl zinc bromide, 3,4-diethenyl indenyl rhenium bromide, 3-ethyl fluorenyl copper bromide, 4,5-dipropyl fluorenyl manganese bromide, 6-ethenyl fluorenyl titanium bromide, 4-benzyl fluorenyl vanadium bromide, 4,5,6,7-tetrahydroindenyl chromium bromide, 2-ethyl-3-phenyl-4,5,6,7-tetrahydroindenyl copper bromide, 2,3-dimethyl cyclopentadienyl manganese iodide, 1,5-dipentyl cyclopentadienyl cadmium iodide, 2-methyl-4-tertiary butyl cyclopentadienyl tin iodide, 1-methyl cyclopentadienyl zinc iodide, 2-methyl indenyl manganese iodide, 3-sec-butyl indenyl tin iodide, 3,4-diethenyl indenyl rhenium iodide, 3-ethyl fluorenyl germanium iodide, 4,5-dipropyl fluorenyl lead iodide, 9-methyl fluorenyl mercury iodide, 4-benzyl fluorenyl copper iodide, 4,5,6,7-tetrahydroindenyl zinc iodide, 3-methyl-4,5,6,7-tetrahydroindenyl chromium iodide, di-(1-methyl cyclopentadienyl)-boron fluoride, di-(1,5-dipentyl cyclopentadienyl)-aluminum fluoride, di-(2-methyl-4-tertiary butyl cyclopentadienyl)-vanadium fluoride, di-(2,3-dimethyl cyclopentadienyl)-phosphorus fluoride, di-(2-methyl indenyl)-scandium fluoride, di-(3-sec-butyl indenyl)-vanadium fluoride, di-(3,4-diethenyl indenyl)-gallium fluoride, di-(3-ethyl fluorenyl)-arsenic fluoride, di-(4,5-dipropyl fluorenyl)-yttrium fluoride, di-(6-ethenyl fluorenyl)-colombium fluoride, di-(4-benzylfluorenyl)-molybdenum fluoride, di-(4,5,6,7-tetrahydroindenyl)-indium fluoride, di-(1-methyl cyclopentadienyl)-lanthanum chloride, di-(3-ethyl cyclopentadienyl)-gold chloride, di-(1,3,4-tripropyl cyclopentadienyl)-thallium chloride, di-(3-isopropenyl cyclopentadienyl)-bismuth chloride, di-(2-methyl indenyl)-antimony chloride, di-(3-sec-butyl indenyl)-boron chloride, di-(4,5-di-phenyl-indenyl)-phosphorus chloride, di-(3-ethyl fluorenyl)-scandium chloride, di-(6-ethenyl fluorenyl)-gallium chloride, di-(1,2,3,4,5,6,7,8-octahydrofluorenyl)-arsenic chloride, di-(1-methyl cyclopentadienyl)-boron bromide, di-(3-ethyl cyclopentadienyl)-indium bromide, di-(3-isopropenyl cyclopentadienyl)-gold bromide, di-(1,5-dipentyl cyclopentadienyl)-antimony bromide, di-(2-methyl indenyl)-gold bromide, di-(3,4-diethenyl indenyl)-molybdenum bromide, di-(4,5-di-phenyl indenyl)-gallium bromide, di-(3-ethyl fluorenyl)-phosphorus bromide, di-(4,5-dipropyl fluorenyl)-titanium bromide, di-(9-methyl fluorenyl)-gallium bromide, di-(4,5,6,7-tetrahydroindenyl)-colombium bromide, di-(3-methyl 4,5,6,7-tetrahydroindenyl)-arsenic bromide, di-(3-ethyl cyclopentadienyl)-yttrium iodide, di-(1-methyl cyclopentadienyl)-indium iodide, di-(2,3-dimethyl cyclopentadienyl)-colombium iodide, di-(1,5-dipentyl cyclopentadienyl)-antimony iodide, di-(3,4-diethenyl indenyl)-gallium iodide, di-(2-methyl indenyl)-molybdenum iodide, (3-sec-butyl indenyl)- vanadium iodide, di-(3-phenyl indenyl)-gold iodide, di-(3-ethyl fluorenyl)-thallium iodide, di-(4,5-dipropyl fluorenyl)-lanthanum iodide, di-(9-methyl fluorenyl)-indium iodide, di-(6-ethenyl fluorenyl)-phosphorus iodide, di-(2-m-tolyl fluorenyl)-gallium iodide, di-(3-methyl-4,5,6,7-tetrahydroindenyl)-antimony iodide, and the like. It is to be noted that generally speaking the compounds of the present invention which contain elements normally tending to acquire a divalent positive charge contain one cyclomatic radical whereas those compounds normally tending to acquire a trivalent ionic state contain two cyclomatic radicals.

Reference to the compounds described in the preceding specific examples exemplifies the unusual characteristics of the compounds of this invention. Without being bound by the following discussion regarding the chemical nature of our materials we believe them to comprise a class of quasi ionic compounds. That is to say, we believe that the mixed organometallic compounds of the present invention possess chemical bonding of a quasi ionic nature while at the same time maintaining a number of characteristics of true organometallic compounds. The quasi ionic nature of our materials is evidenced by both a relatively high dipole moment possessed by such compounds and their relatively low solubility in most common organic solvents. However, notwithstanding these characteristics our materials apparently are sufficiently organic in nature so as to dissolve in certain solvents to the extent necessary to undergo many typical organic reactions. Therefore, although our mixed organic compounds containing at least one cyclopentadienyl moiety are fundamentally organic in nature they possess some of the more desirable characteristics of inorganic substances. By way of example many of our compounds can be separated from their preparative environments and be stored in the crystalline state without physical or chemical decomposition. Likewise, as indicated hereinbefore many of the materials of the present invention are stable to relatively high temperatures a property not shared by the mixed organic compounds such as the aryl or alkyl metallic halides known heretofore. Still another characteristic of the compounds of the present invention is their ability to undergo either replacement or inter-change type reactions. That is to say, the halogen portion of the compounds of this invention can readily be replaced either by other univalent type radicals or by a different halogen atom. It will be apparent, therefore, that our compounds can readily be modified so as to increase their utility in the preparation of agricultural chemicals, pharmaceuticals, and other useful materials.

An additional characteristic of the compounds of our invention is that for a given compound the stability appears to be a function of the effective atomic or ionic radius of the halogen portion of the molecule. That is to say, generally speaking the smaller the halogen constituent the greater is the stability. In most instances this generalization also applies in the case of the relative reactivities of our compounds.

As mentioned hereinbefore a particular advantage of the new compositions of matter of the present invention is the fact that by proper selection of the individual groups comprising such compositions compounds having different characteristics can be obtained. Thus, by the proper selection of the metallic element, the cyclomatic group and the halogen constituent, it is possible to prepare compounds possessing different degrees of stability, volatility, solubility and reactivity. It will be apparent that the diversity of these characteristics enhances the general utility of our compounds. Therefore, by judicious selection of the constituents in our compounds it is possible to prepare compounds which are useful in their own right as components in pigments, lakes, and other dye stuffs thereby making full use of the chromophoric characteristics of many of our materials. On the other hand, the presence of a relatively active halogen in many of our compounds facilitates their use as chemical intermediates by typical condensation reactions. By so doing, such materials as therapeutic agents, diuretics and other medicinals can be prepared contingent of course upon the nature of the metallic element present in the resulting compounds. In contrast, by selecting a compound containing a toxicological element and subjecting the same to typical condensation reactions biocidal materials of utility in such formulations as insect powders and sprays, fungus preventing agents, growth regulants, and the like can be prepared. Other specific applications of the materials of the present invention per se and of the reaction products derived therefrom will be apparent to those skilled in the art.

Having fully described the novel mixed cyclopentadienyl moiety-containing organometallic compounds of the present invention, the need therefor, and the best methods devised for their preparation, we do not intend that our invention be limited except within the spirit and scope of the appended claims.

We claim:

1. As new compositions of matter mixed cyclopentadienyl moiety-containing quasi ionic organometallic compounds possessing the general formula $$R_nMX$$

wherein R is a cyclopentadienyl moiety-containing hydrocarbon radical, $n$ is a small whole integer from 1 to 2 inclusive, X is selected from the group consisting of fluorine, chlorine, bromine and iodine, and M is a heavy metal selected from the class consisting of the metals of groups I–B, II–B, III–A, III–B, IV–A, IV–B, V–A, V–B, VI–A, VI–B, and VII–B of the periodic table.

2. New compositions of matter as in claim 1 wherein M is zinc and $n$ is 1.

3. Cyclopentadienyl zinc chloride.

4. New compositions of matter as in claim 1 wherein M is cadmium and $n$ is 1.

5. Cyclopentadienyl cadmium iodide.

6. As new compositions of matter mixed cyclopentadienyl moiety-containing quasi ionic organometallic compounds possessing the general formula $$R_2MX$$

wherein R is a cyclopentadienyl moiety-containing radical, X is a halogen and M is a Group VI–B element.

7. New compositions of matter as in claim 6 wherein M is chromium.

8. Dicyclopentadienyl chromium bromide.

9. The composition of claim 1 where M is a group II–B element and $n$ is 1.

10. The composition of claim 1 where M is a group VII–B metal and $n$ is 1.

11. The composition of claim 10 where M is manganese.

References Cited in the file of this patent

Keally et al.: Nature, vol. 168, pp. 1039 to 1040, December 15, 1951.

Wilkinson (I): Journal American Chem. Soc., vol. 74, p. 6148, December 5, 1952.

Wilkinson (II): Jour. Am. Chem. Soc., vol. 74, pp. 6146–47, December 5, 1952.

Wilkinson (IV): Jour. Am. Chem. Soc., vol. 74, pp. 2125–26, April 20, 1952.

Wilkinson (III): Jour. Am. Chem. Soc., vol. 75, pp. 1011–12, February 20, 1953.

Fischer et al.: Zeitschrift für Naturforschung, Band 8(b), Heft 1, January 1953.

UNITED STATES PATENT OFFICE
Certificate of Correction

Patent No. 2,864,843 December 16, 1958

Earl G. De Witt et al.

It is hereby certified that error appears in the above numbered patent requiring correction and that the said Letters Patent should read as corrected below.

Column 5, lines 13 to 17 inclusive, the formula should appear as shown below instead of as in the patent—

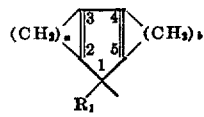

column 8, line 28, for "(3-sec-butyl indenyl)-vanadium iodide" read —di(3-sec-butyl indenyl)-vanadium iodide—.

Signed and sealed this 7th day of July 1959.

[SEAL]

Attest:
KARL H. AXLINE,
*Attesting Officer.*

ROBERT C. WATSON,
*Commissioner of Patents.*